(12) United States Patent
Fujii et al.

(10) Patent No.: US 10,011,206 B2
(45) Date of Patent: Jul. 3, 2018

(54) VEHICLE SEAT WITH DETACHABLE CAP FOR ANCHOR STORAGE RECESS

(71) Applicants: TACHI-S CO., LTD., Akishima-shi, Tokyo (JP); HONDA MOTOR CO., LTD., Minato-ku, Tokyo (JP)

(72) Inventors: Hiroyuki Fujii, Tokyo (JP); Jonathan Garcia, Tokyo (JP); Kengo Kataoka, Tokyo (JP); Makoto Nomura, Tokyo (JP); Kazuhisa Nishimura, Saitama (JP); Kanae Tsukidate, Saitama (JP)

(73) Assignees: TACHI-S CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/639,342

(22) Filed: Jun. 30, 2017

(65) Prior Publication Data

US 2018/0022245 A1    Jan. 25, 2018

(30) Foreign Application Priority Data

Jul. 21, 2016  (JP) .................................. 2016-143593

(51) Int. Cl.
*B60N 2/90* (2018.01)
*B60N 2/58* (2006.01)
*B60N 2/28* (2006.01)

(52) U.S. Cl.
CPC ................. *B60N 2/90* (2018.02); *B60N 2/58* (2013.01); *B60N 2/2887* (2013.01)

(58) Field of Classification Search
CPC ..... B60N 2/2887; B60N 2/289; B60N 2/2893; B60N 2/90; B60N 2/44; B60N 2/58
USPC .................................................. 297/463.1, 253
See application file for complete search history.

(56) References Cited

U.S. PATENT DOCUMENTS

2016/0200224 A1* 7/2016 Fujikake ................ B60N 2/289
297/452.38

FOREIGN PATENT DOCUMENTS

| JP | 2002-178810 A | 6/2002 | |
| JP | 2008-273430 A | 11/2008 | |
| JP | 2015-036282 A | 2/2015 | |
| JP | 2015067255 A * | 4/2015 | ........... B60N 2/6009 |

* cited by examiner

*Primary Examiner* — Milton Nelson, Jr.
(74) *Attorney, Agent, or Firm* — Shapiro, Gabor and Rosenberger, PLLC

(57) ABSTRACT

A simply structured vehicle seat with reduced number of parts includes a cap for covering an anchor storage recess which stores an anchor to be engaged with an engagement member attached to a child seat. The anchor storage recess includes a side part and a bottom part. A cap is provided for covering the anchor storage recess, and includes a flange part, a main body part, and a slit. The main body part has a dimension larger than an inner dimension of the side part of the anchor storage recess. The cap is detachably fitted with the anchor storage recess by engagement between the anchor and the slit and pressure contact between the side part of the anchor storage recess and the main body part of the cap, when the main body of the cap is inserted along the side part into the anchor storage recess.

6 Claims, 3 Drawing Sheets

VEHICLE SEAT WITH DETACHABLE CAP FOR ANCHOR STORAGE RECESS

CLAIM OF PRIORITY

The present application claims priority from Japanese Patent application serial No. 2016-143593, filed on Jul. 21, 2016, the content of which is hereby incorporated by reference into this application.

TECHNICAL FIELD

The present invention relates to a vehicle seat having an anchor for holding a child seat.

BACKGROUND ART

International Standard ISO-FIX has been established, specifying the method for fixing the child seat to the vehicle seat. Japanese Patent Application Laid-Open No. 2015-36282 (Patent Literature 1) discloses background art of the vehicle seat configured to store the ISO-FIX compatible anchor capable of fixing the ISO-FIX type child seat. The vehicle seat disclosed in Patent Literature 1 has been made to solve the problem of deterioration in appearance quality owing to revealed recess of the pad that has been covered with the bezel attached thereto, which is made visible through the bottom hole of the bottom wall of the bezel for the anchor. Specifically, the vehicle seat includes the anchor engaged with an engagement member of the child seat so as to be held, and a recess for storing the anchor, which is formed in the pad at the rear end of the seat cushion, or at the lower end of the seat back, and the trim cover for covering the pad, which is opened above the pad recess covered with the bezel from above the trim cover. The bezel made of flexible material has upper and lower flaps integrated to constitute the bottom wall of the bezel. The bezel is put over the pad recess while leaving space to the rear of the upper and the lower flaps. The engagement member of the child seat is brought into engagement with the anchor by pushing the upper and the lower flaps of the bezel rearward into the space behind the pad recess. Alternatively, the engagement may be made without pushing the upper and the lower flaps rearward.

CITATION LIST

Patent Literature

PTL 1: Japanese Patent Application Laid-Open No. 2015-36282

SUMMARY OF INVENTION

Technical Problem

As described in Patent Literature 1, the bezel has a separate cap which is molded from the same flexible material for forming the bezel, for example, elastomer. The cap is shaped corresponding to the opening of the bezel. The cap includes the engagement member such as an engagement protrusion so as to be detachably fitted with the bezel. The bezel includes the engagement member such as the engagement groove. The cap is fitted with the bezel by the respective engagement members.

The structure disclosed in Patent Literature 1 includes the above-structured cap and bezel, each requiring the engagement member for detachably fitting the cap with the bezel. This may complicate the structure, and increase the number of parts.

In view of the aforementioned problem, it is an object of the present invention to provide a simply structured vehicle seat with reduced number of parts using a cap that covers the anchor storage recess for storing the anchor which holds the child seat.

Solution to Problem

The present invention may be exemplified as below.

The vehicle seat includes an anchor storage recess foiled in a pad that constitutes the seat, which stores an anchor engaged with an engagement member attached to a child seat. The anchor storage recess includes a side part and a bottom part. A cap is provided for covering the anchor storage recess, and includes a flange part, a main body part, and a slit. The main body part has a dimension larger than an inner dimension of the side part of the anchor storage recess. The cap is detachably fitted with the anchor storage recess by engagement between the anchor and the slit, and pressure contact between the side part of the anchor storage recess and the main body part of the cap when inserting the cap along the side part of the anchor storage recess.

Advantageous Effects of Invention

The present invention ensures to provide the simply structured vehicle seat with reduced number of parts using the cap that covers the anchor storage recess for storing the anchor which holds the child seat.

DESCRIPTION OF EMBODIMENTS

Figure 1:
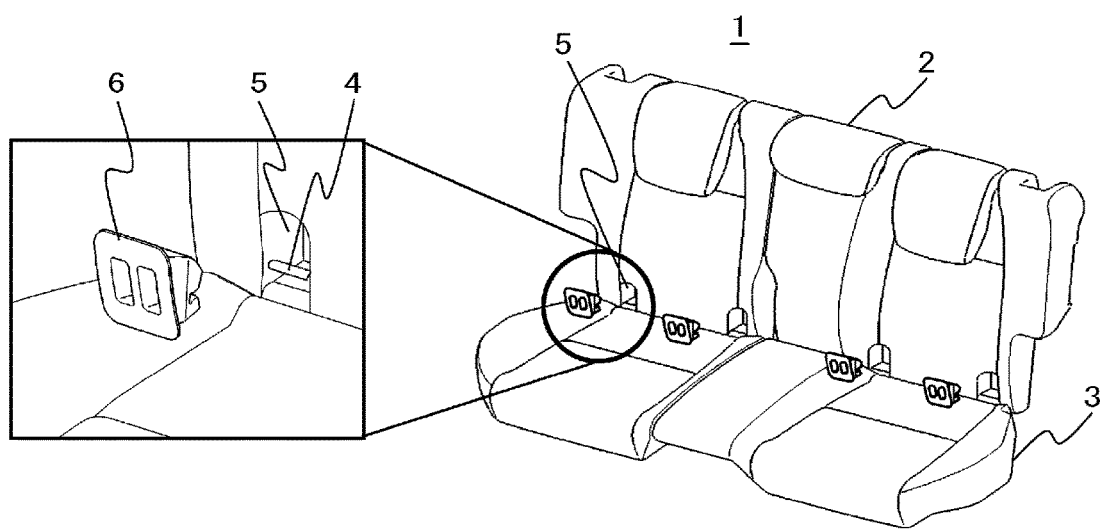
FIG. 1 is a perspective view schematically showing a vehicle seat according to a first embodiment.

Embodiments according to the present invention will be described as below referring to the drawings.
First Embodiment FIG. 1 is a schematic perspective view of a vehicle seat according to an embodiment. Referring to FIG. 1, the vehicle seat 1 includes a seat back 2, a seat cushion 3, and an ISO-FIX compatible anchor 4 capable of fixing the child seat of ISO-FIX type compatible to the International Standard ISO-FIX specifying the method for fixing the child seat to the vehicle seat 1. The child seat is held by engaging an engagement member attached to the child seat with the anchor 4 of the vehicle seat 1. An anchor storage recess 5 for storing the anchor 4 is famed at the lower end of the seat back 2. The anchor storage recess 5 may be famed at the rear end of the seat cushion 3.

The left view of FIG. 1 shows an enlarged peripheral part of the anchor storage recess 5 of the seat back 2. The anchor 4 is visibly disposed inside the anchor storage recess 5 so as to allow easy engagement of the engagement member of the child seat with the anchor 4 while visually confirming the position of the anchor 4. A code number 6 denotes a cap serving as a cover for covering the anchor storage recess 5 when the child seat is demounted. It also serves as the member for preventing deterioration in the appearance design when the child seat is demounted.

Figure 2:
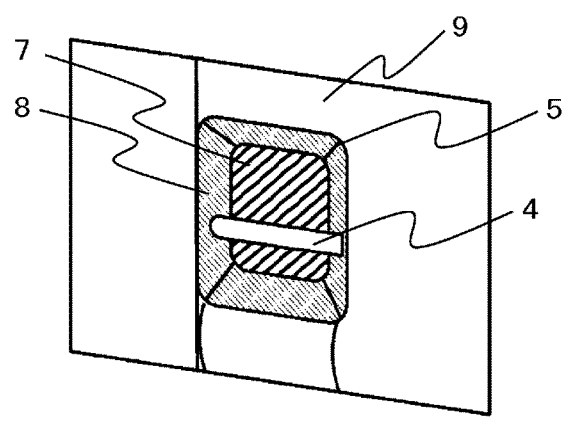
FIG. 2 is an enlarged schematic view of an anchor storage recess for storing an ISO-FIX compatible anchor according to the first embodiment.

FIG. 2 is an enlarged schematic view of the anchor storage recess 5 for storing the ISO-FIX compatible anchor according to the embodiment. The seat back 2 is formed by applying a pad made of a foaming material such as a foamed urethane to the cushion frame, and covering the pad with the trim cover. Referring to FIG. 2, the anchor storage recess 5 for storing the anchor 4 is formed in the pad. The anchor storage recess 5 includes a bottom part 7 and a side part 8. The side part 8 made of a flexible material such as fabric is sewn to the end part of a trim cover 9, constituting the anchor storage recess 5.

Figures 3A, 3B, 3C:
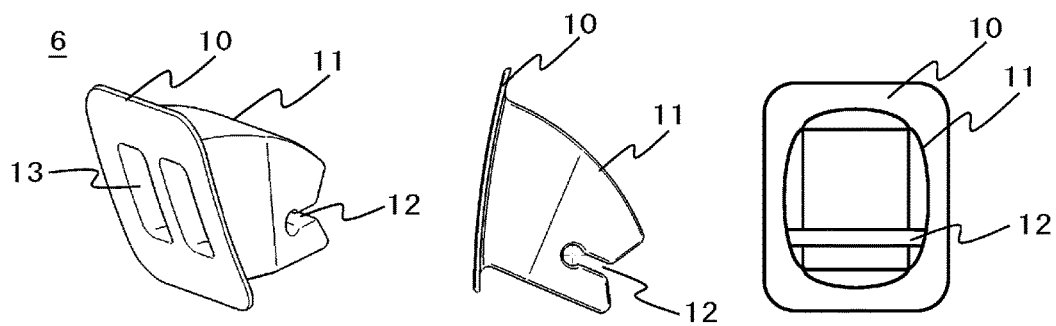
FIGS. 3A to 3C are a schematic view of a cap which covers the anchor storage recess according to the first embodiment.

FIGS. 3A to 3C are a schematic view of the cap 6 for covering the anchor storage recess 5 according to the embodiment. FIG. 3A is a perspective view, FIG. 3B is a cross-sectional view, and FIG. 3C is a back view. As FIG. 3 illustrates, the cap 6 includes a flange part 10 and a main body part 11 having a slit 12. The cap 6 made of a flexible material such as urethane is constituted by integrally molding the flange part 10 and the main body part 11. The cap is inserted along the side part 8 of the anchor storage recess 5 as shown in FIG. 2 so as to be fitted with the anchor storage recess 5. In the aforementioned process, the slit 12 exhibits the function for positioning and holding the cap 6 through engagement with the anchor 4 inside the anchor storage recess 5. As FIG. 3C shows, the main body part 11 of the cap 6 has a dimension slightly larger than the inner dimension of the side part 8 of the anchor storage recess 5, constituting the rounded structure. The pressure contact between the side part 8 of the anchor storage recess 5 and the main body part 11 of the cap 6 allows the cap 6 to be detachably fitted with the anchor storage recess 5 under repulsion force and friction force generated by the flexible material such as urethane. In other words, this makes it possible to provide the simply structured vehicle seat with reduced number of parts without requiring the engagement members for detachably fitting the cap with the anchor storage recess. Because of flexibility, the cap 6 hardly gives the occupant a foreign matter feeling upon seating, nor destroys other members owing to friction.

The cap 6 may be made of relatively hard resin material. In such a case, the pressure contact between the side part 8 of the anchor storage recess 5 and the main body part 11 of the cap 6 allows detachable fitting of the cap 6 with the anchor storage recess 5 under the repulsion force and friction force generated by the flexible material that constitutes the side part 8 of the anchor storage recess 5.

It is also possible to use the flange part 10 and the main body part 11, each of which is made of a different material for constituting the cap 6 through bonding or fixing rather than integral molding. The thus famed cap 6 may also be detachably fitted with the anchor storage recess 5 in the same way as described above.

A depressed part 13 is formed in the front surface of the cap 6, which assists the operator in using the finger for detachably fitting the cap with the anchor storage recess 5.

The cap 6 may be colored in the same color as that of the trim cover 9 so that covering with the trim cover is unnecessary. This makes it possible to further suppress deterioration in the appearance design upon fitting of the cap 6 with the anchor storage recess 5 by means of the simplified and inexpensive structure.

Second Embodiment

Figure 4A:
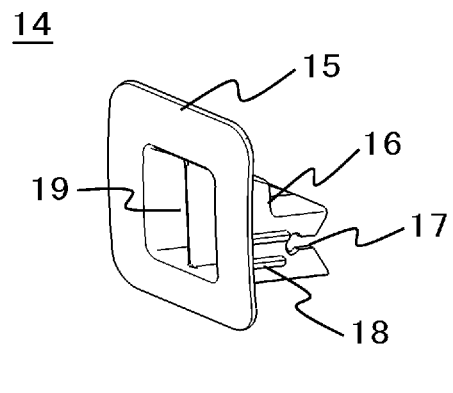
FIGS. 4A and 4B are a schematic view of a cap which covers the anchor storage recess according to a second embodiment.
Figure 4B:
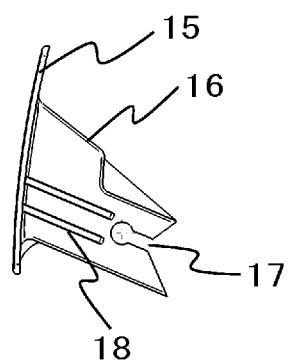

FIGS. 4A and 4B are a schematic view of a cap 14 for covering the anchor storage recess 5 according to the embodiment. FIG. 4A is a perspective view, and FIG. 4B is a cross-sectional view. Likewise the first embodiment, the cap 14 according to the embodiment includes a flange part 15 and a main body part 16, having a slit 17 and a depressed part 19. The cap 14 according to the embodiment, which is made of a soft shell material such as elastomer is constituted by integrally molding the flange part 15 and the main body part 16. The basic structure and effect are similar to those derived from the first embodiment, and explanations thereof, thus will be omitted. This embodiment is characterized by a protrusion 18 formed on the main body part 16, and a rib structure formed inside the main body part 16 for thinning.

The pressure contact between the side part 8 of the anchor storage recess 5 and the protrusion 18 of the main body part 16 of the cap 14 allows the cap 14 to be detachably fitted with the anchor storage recess 5. In other words, the embodiment ensures to provide the simply structured vehicle seat with reduced number of parts without requiring the engagement member for detachably fitting the cap with the anchor storage recess. The use of the rib structure for thinning purpose allows the material cost reduction.

Likewise the first embodiment, the cap 14 is colored in the same color as that of the trim cover 9 for further suppressing deterioration in the appearance design upon fitting of the cap 14 with the anchor storage recess 5 by means of the simple and inexpensive structure without requiring the trim cover for covering.

Third Embodiment

Figure 5:
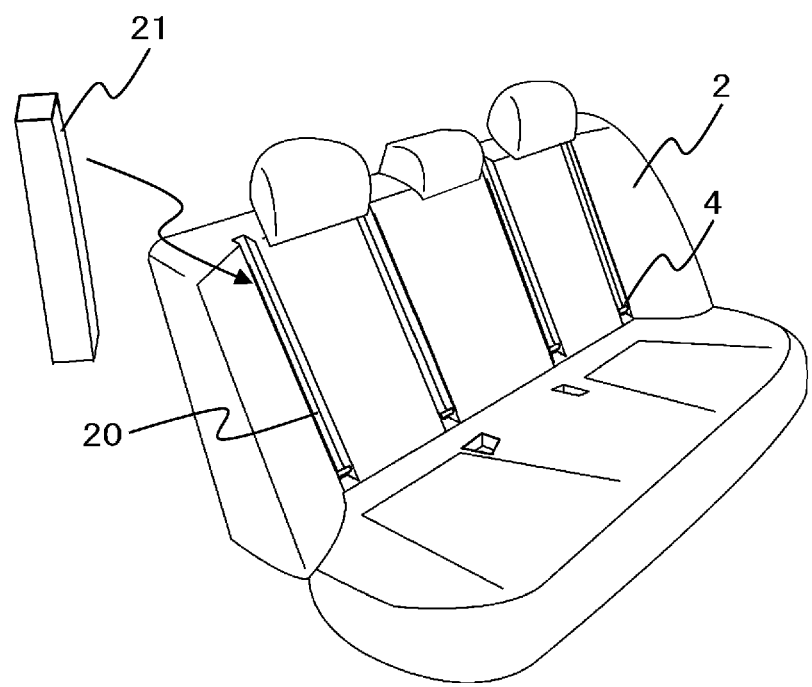
FIG. 5 is a perspective view schematically showing a vehicle seat according to a third embodiment.

FIG. 5 is a schematic perspective view of the vehicle seat according to the embodiment. This embodiment is different from the first and the second embodiments in that an anchor storage recess 20 for storing the ISO-FIX compatible anchor 4 capable of fixing the child seat of ISO-FIX type is formed along the longitudinal length of the seat back 2. That is, unlike the structure having the anchor storage recess foiled only at the lower end of the seat back 2, the anchor storage recess 20 extends upward from the lower end. When the child seat is demounted, a cap 21 serves to cover the anchor storage recess 20 for preventing deterioration in the appearance design when the child seat is demounted. If the child seat is mounted, the cap 21 is unnecessary from the originally set purpose, but will serve to exhibit the cushioning function owing to its length to a certain degree. The longitudinally long shape of the anchor storage recess 20 assures the design property as well.

In this embodiment, the anchor storage recess has a longitudinally long shape. However, the anchor storage recess may have a transversely long shape or an arbitrary shape so long as the recess accommodates the anchor, and the engagement member of the child seat hardly interferes with engagement with the anchor.

The present invention is not limited to the embodiments as described above, but includes various modifications. For example, the embodiments are described in detail for readily understanding of the present invention which is not necessarily limited to the one equipped with all structures as described above. It is possible to replace a part of the structure of one embodiment with the structure of another embodiment. The one embodiment may be provided with an additional structure of another embodiment. It is further possible to add, remove, and replace the other structure to, from and with a part of the structure of the respective embodiments.

What is claimed is:

1. A vehicle seat having an anchor storage recess formed in a pad that constitutes a part of the seat, the anchor storage recess storing an anchor to be engaged with an engagement member attached to a child seat, wherein:
  the anchor storage recess includes a side part and a bottom part,
  the side part of the anchor storage recess is made of a flexible material, and sewn to an end part of a trim cover for covering the pad,
  a cap is provided for covering the anchor storage recess, and includes a flange part, a main body part, and a slit, the main body part having a dimension larger than an inner dimension of the side part of the anchor storage recess,
  the cap is detachably fitted with the anchor storage recess by engagement between the anchor and the slit, and pressure contact between the side part of the anchor storage recess and the main body part of the cap, when the main body part of the cap is inserted along the side part into the anchor storage recess.

2. The vehicle seat according to claim 1, wherein the cap is integrally molded from a flexible material.

3. The vehicle seat according to claim 1, wherein:
  the cap is molded from a soft shell material, and
  the main body part of the cap has a protrusion which makes pressure contact with the side part of the anchor storage recess when the main body part of the cap is inserted along the side part into the anchor storage recess.

4. The vehicle seat according to claim 1, wherein the main body part of the cap is formed into a rounded structure.

5. The vehicle seat according to claim 1, wherein the cap has a depressed part in a front surface.

6. The vehicle seat according to claim 1, wherein the cap is colored in a color similar to a color of the trim cover.

\* \* \* \* \*